United States Patent [19]

Mitchell et al.

[11] 3,870,679

[45] Mar. 11, 1975

[54] SMOKE RETARDANT VINYL HALIDE POLYMERS

[75] Inventors: Lawrence C. Mitchell, Mount Vernon, Ind.; Gary L. Ter Haar, Farmington, Mich.

[73] Assignee: Ethyl Corporation, Richmond, Va.

[22] Filed: Apr. 16, 1973

[21] Appl. No.: 351,572

Related U.S. Application Data

[63] Continuation-in-part of Ser. No. 196,802, Nov. 8, 1971, abandoned.

[52] U.S. Cl.. 260/45.75 N, 260/41 B, 260/45.75 C, 260/45.75 R, 260/2.5 FP
[51] Int. Cl. ............................................. C08f 45/56
[58] Field of Search .... 260/45.75 R, 41 B, 45.75 N, 260/2.5 FP, 2.5 R

[56] References Cited
UNITED STATES PATENTS

| | | | |
|---|---|---|---|
| 2,855,266 | 10/1958 | James | 260/DIG. 43 |
| 2,880,103 | 3/1959 | Soule et al. | 260/2.5 |
| 3,090,763 | 5/1963 | Hillies | 260/2.5 |
| 3,326,832 | 6/1967 | Rauschenback | 260/45.75 |
| 3,474,464 | 10/1969 | Matthews et al. | 260/45.75 |

OTHER PUBLICATIONS

Chemistry and Uses of Fire Retardants–Lyon, Wiley Interscience 1970, pp. 3 to 14.

*Primary Examiner*—V. P. Hoke
*Attorney, Agent, or Firm*—D. L. Johnson; R. A. Linn

[57] ABSTRACT

Molybdenum compounds impart smoke retardant properties to combustible materials such as plastics. Thus, for example, polyvinyl chloride does not emit as much smoke during combustion when it is compounded with $MoO_3$.

5 Claims, No Drawings

SMOKE RETARDANT VINYL HALIDE POLYMERS

REFERENCE TO RELATED APPLICATION

This is a continuation-in-part of application Ser. No. 196,802, filed Nov. 8, 1971 and now abandoned.

BACKGROUND OF THE INVENTION

This invention provides additives for plastics that will decrease their tendency to smoke when burned. It is believed that such use of the additives provided has not been described in the art.

Netherlands Pat. No. 69/18,861 is reported to teach that preparations of antimony trioxide and an inorganic salt impart flame and smoke reducing properties to resin compositions.

Iron oxide and other oxides have been added to polyvinyl halide for pigment purposes; Woernle, SPE Journal, pages 535–544 (May 1960); DeCaste and Hansen, Ibid. 18 No. 4, pages 431–439 (April 1962).

SUMMARY OF THE INVENTION

In one aspect, this invention provides a polyvinyl halide admixed with a smoke retardant amount of molybdenum oxide or molybdenum carbonyl. In another aspect, this invention provides polyvinyl halide blended with a molybdate such as ammonium paramolybdate. Molybdenum trioxide is the preferred molybdenum oxide for the above compositions.

This invention also provides a method for imparting smoke retardancy to plastics which method comprises blending resins with compounds such as set forth above. Similarly, this invention provides blends of molybdenum compounds for incorporation in resins. Such blends may be mixtures of the compounds themselves or the compound or mixtures thereof can be combined with the resin or other materials such as a solvent, or a plasticizer or other ingredient utilized to form a resin composition.

Smoke can be a hazard during a fire. Dense smoke hampers fire fighting measures and can obscure escape routes for those within a burning enclosure. Therefore, building materials which emit lesser amounts of smoke during combustion can be a safety feature. This invention serves to provide compositions with lessened tendencies to smoke and accordingly, one utility of this invention pertains to improvement in materials utilized in construction. However, formulations of this invention can be used wherever it is desirable to use materials which can lessen the amount of smoke produced upon combustion.

DESCRIPTION OF PREFERRED EMBODIMENTS

In the practice of this invention, a smoke retardant amount of additive is used to treat a combustible material such as a plastic resin.

Polyvinyl halide resins can be used in this invention. Applicable polyvinyl halides include homopolymers, copolymers and polymer mixtures. Illustrative and nonlimiting examples of applicable polyvinyl halide resins are:

1. Homopolymers — Polyvinyl chloride, polyvinyl bromide, polyvinyl fluoride, polyvinylidene chloride, polydichlorostyrene and the like, 2. Copolymers — Vinylchloride-vinyl acetate, vinylchloride-vinyl alcohol, vinylchoride-vinylidene chloride, vinylchloride-diethyl maleate, vinyl chloride esters of unsaturated alcohols and unsaturated acids and the like, and 3. Mixtures — Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

The resins can be treated with the smoke retardant additive or additives in any convenient manner. In some instances, smoke retardancy may be achieved by treating one or more surfaces of a plastic article with the additive or additives such that a treated surface is overlayed or padded with the additive composition. However, in general, it is preferred to blend an additive within a resin composition. The blending can be accomplished by any appropriate blending or mixing technique available in the art.

In the practice of this invention, a smoke retardant amount of provided additive is used to treat a combustible substance. In general, there is usually a relationship between the smoke retardancy achievable and the amount of additive employed. Therefore, at least within some concentration range, usually a greater amount of additive will provide a greater amount of smoke retardancy, all other factors remaining the same. In some instances, there is a pratical upper limit on the amount of additive used. This upper limit is based on secondary factors such as cost, ease of blending, or interference with some other desirable property of the substrate, for example. In many instances, from about 0.5 to about 40 parts are used for each 100 parts of substrate resin. Preferably from about 1 to about 30 parts for 100 parts resin, more preferably 1 to about 15 parts per 100 parts resin are employed. However, greater or lesser amounts can be used if desired.

Molybdenum trioxide, $Mo0_3$, can be used in this invention. Also it has been found that molybdenum carbonyl and ammonium paramolybdate reduce smoke. These may be admixed.

Applicability of such compounds suggest other molybdenum compounds can be blended; for example, oxides and sulfides; viz. $MoO_2$, $Mo_2O_5$, $Mo_2O_3$, $MoS_2$, $MoS_3$, $MoS_4$, $Mo_2S_3$, metal molybdates such as ammonium and copper molybdate, molybdenum salts of carboxylic acids such as acetates and butyrates, chelates such as the actylacetonates, and organomolybdenum compounds. To illustrate the smoke retardation, the following example is presented.

EXAMPLE

| PVC* Formulas: | Rigid | 20 wt. % DOP** | 33 wt. % DOP |
|---|---|---|---|
| Ethyl PVC 500 natural | 100 parts | | |
| Ethyl PVC SM-250 | | 100 parts | 100 parts |
| Dioctyl phthalate (DOP) | | 30 parts | 50 parts |
| Mark WS (Stabilizer) | | 1.0 parts | 1.0 parts |
| Stearic acid (Lubricant) | | 0.5 parts | 0.5 parts |
| Smoke retardant | As indicated | As indicated | As indicated |

*polyvinyl chloride
**di-isooctylphthalate

The smoke retardants were mixed by hand with the appropriate substrate and then mixed by Waring Blendor, Brabender Plastograph, or plastic mill. The homogeneous mixture was molded in a heated press under pressure. The resulting sheet was conditioned in an air circulated oven at 70°C. overnight and at 73°F. and 50% relative humidity overnight.

Smoke Tests:

A. XP-2 Chamber

Samples 3 ½ inches × 1 inch × one-fourth inch were cut into three 1 inch × 1 inch × one-fourth inch specimens. These were burned under controlled conditions in the XP-2 smoke chamber according to ASTM Method D2843-70. The average of three values was reported.

A wire basket was inverted over the samples on the wire screen to prevent the PVC from "bending away" from the flame.

Maximum light obscuration, Am, was determined by visual observation of the meter on the apparatus. The time to reach 70% light obscuration, $t_{A=70}$, was measured off the chart from the recorder. The recorder automatically plotted curves of light absorption versus time.

B. Aminco NBS Chamber

Specimens 3 inches × 3 inches square and 50 mil thick were cut. The conditioned specimen was placed on aluminum foil cut to size to permit overlapping of the specimen face on all four sides. The wrapped specimen was placed in a holder and burned in the Aminco NBS smoke chamber according to the directions supplied. The amount of smoke was measured by a photomultiplier. Specific optical density was calculated and corrected for soot remaining at the end of the test. The average of two values was reported.

Results[1]

|  | $Am^2$ | $t_{A=70}$ (min)[3] |
|---|---|---|
| Molybdenum trioxide | | |
| $MoO_3$ | 91 | 0.78 |
| do. | 93+ | 0.58 |
| Molybdenum carbonyl | | |
| $Mo(CO)_6$ | 92 | 0.71 |
| Molybdenum disulfide | | |
| $MoS_2$ | 98 | 0.57 |
| Molybdenum oxalate | | |
| $H_2[MoO_3(C_2O_4)(H_2O)] \cdot H_2O$ | 90 | 0.94 |
| Ammonium paramolybdate | | |
| $(NH_4)_6Mo_7O_{24} \cdot XH_2O$ (X ≥ 4) | 96- | 0.85 |
| Dimeric ammonium 5-molybdocobaltate (III) | | |
| $(NH_4)_6[Co_2Mo_{10}O_{36}] \cdot XH_2O$ (X=6–10) | 85 | 1.16 |
| Ammonium 6-molybdocobaltate (III) | | |
| $(NH_4)_3[CoMo_6O_{24}H_6] \cdot XH_2O$ (X=5–7) | 91 | 0.92 |
| Ammonium 9-molybdonickelate (IV) | | |
| $(NH_4)_6[NiMo_9O_{32}] \cdot 6.5\ H_2O$ | 91 | 0.82 |
| Ammonium 6-molybdonickelate (II) | | |
| $(NH_4)_4[NiMo_6O_{24}H_6] \cdot XH_2O$ (X=4–6) | 93 | 0.78 |
| Ammonium 6-molybdoaluminate (III) | | |
| $(NH_4)_3[AlMo_6O_{24}H_6] \cdot XH_2O$ (X=4–7) | 93 | 0.81 |
| Ammonium 6-molybdochromate (III) | | |
| $(NH_4)_3[CrMo_6O_{24}H_6] \cdot XH_2O$ (X=4–7) | 94 | 0.78 |
| Ammonium 6-molybdoferrate (III) | | |
| $(NH_4)_3[FeMo_6O_{24}H_6] \cdot XH_2O$ (X=5–10) | 96- | 0.66 |
| Molybdenyl acetylacetonate[4] | | |
| $(MoO_2)(C_5H_7O_2)_2$ | 93 | 0.77 |

[1] samples were placed on wire screen and wire basket was inverted over sample
[2] maximum percent light absorption
[3] $t_{A=70}$ (min) - time in minutes for light absorption to reach 70%
[4] 10.2 phr of compound incorporated in sample Analogous results are obtained when from 0.5 to 40 phr (parts per hundred parts resin) are employed and when the homopolymers, copolymers and resin mixtures (listed when describing applicable resins) above are used.

Analogous results are obtained with $MoO_2$, $Mo_2O_5$, $Mo_2O_3$, $MoS_3$, $MoS_4$, $Mo_2S_3$, $Mo_2S_5$, copper paramolybdate, ammonium molybdate, copper molybdate and molybdenum acetate, or as can be seen from the above table, complex salts of molybdenum heteropolyacids used in this invention. Use of other salts of such acids and salts of related acids are suggested by these results. For a description of such acids reference is made to pages 526–535 of *Fritz Ephraim Inorganic Chemistry*, 6th Edition by P. C. L. Thorne and E. R. Roberts, Interscience Publishers Inc., New York, N.Y.; 1954.

The molybdenum containing smoke retardants provided by this invention can be used with polyvinyl halide-containing foams such as those which are the subject of U.S. Pat. Nos. 3,338,845, 3,338,846 and 3,409,580.

As indicated above this invention can be used to provide plastic compositions for making articles which afford lesser amounts of smoke upon combustion. For manufacture of such articles the polymer may be supplied admixed with a smoke retardant amount of one or more additives provided by this invention.

Rigid PVC without smoke suppressant additives gave an SODc of 554 when burned in the Aminco NBS Chamber. When containing 1.0, 2.5, and 5.0 wt % of molybdenum trioxide SODc values of 404, 366, and 372, respectively, were obtained.

With 2.7 weight percent (4 phr) of $MoO_3$, PVC with 33 wt % (50 phr) dioctyl phthalate gave an SODc value of 697. This is in contrast to the the SODc value of 702 when no $MoO_3$ was present.

We claim:

1. As a composition of matter, a polyvinyl halide admixed with a smoke retardant amount of molybdenum hexacarbonyl.

2. As a composition of matter, a polyvinyl halide admixed with a smoke retardant amount of ammonium paramolybdate.

3. As a composition of matter, a polyvinyl halide admixed with a smoke retardant amount of molybdenum oxalate.

4. As a composition of matter, a polyvinyl halide admixed with a smoke retardant amount of molybdenum disulfide.

5. As a composition of matter, a polyvinyl halide admixed with a smoke retardant amount of a compound selected from the class consisting of dimeric ammonium 5-molybdocobaltate (III), ammonium 6-molybdocobaltate (III), ammonium 9-molybdonickelate (IV), ammonium 6-molybdonickelate (II), ammonium 6-molybdoaluminate (III), ammonium 6-molybdonchromate (III), and ammonium 6-molybdoferrate (III).

* * * * *